United States Patent [19]

Hölter et al.

[11] Patent Number: 5,223,325

[45] Date of Patent: Jun. 29, 1993

[54] FILTER MEDIUM

[75] Inventors: Heinz Hölter, Beisenstr. 39 -41, 4390 Gladbeck; Heinrich Igelbüscher, Gladbeck; Heinrich Gresch, Dortmund-Wickede; Heribert Dewert, Gladbeck, all of Fed. Rep. of Germany

[73] Assignee: Heinz Hölter, Gladbeck, Fed. Rep. of Germany

[21] Appl. No.: 827,109

[22] Filed: Jan. 24, 1992

Related U.S. Application Data

[63] Continuation-in-part of Ser. No. 469,595, filed as PCT/EP89/00827, Jul. 15, 1989, abandoned.

[30] Foreign Application Priority Data

Jul. 26, 1988 [DE] Fed. Rep. of Germany ....... 3825334

[51] Int. Cl.⁵ .................... B32B 3/00; B01D 50/00
[52] U.S. Cl. ........................ 428/156; 428/72; 428/76; 428/120; 428/166; 428/172; 428/178; 428/179; 428/913; 428/212; 55/482; 55/486
[58] Field of Search ............... 428/178, 188, 186, 172, 428/72, 179, 212, 33, 120, 161, 166, 170, 913; 55/159, 220, 315, 529, 446, 482, 486

[56] References Cited

U.S. PATENT DOCUMENTS 3,544,417 12/1970 Corzine ............................. 428/188
4,250,172 2/1981 Mutzenberg ...................... 428/234

*Primary Examiner*—Donald J. Loney
*Attorney, Agent, or Firm*—Herbert Dubno; Andrew Wilford

[57] ABSTRACT

A fluid-permeable assembly for uniformly contacting a fluid with a bulk material has two mirror-symmetrically interfitting mats each having a generally planar fluid-permeable carrier web, another fluid-permeable web defining an array of protrusions uniformly distributed over the respective planar web and each forming a respective pocket and respective masses of a fluid-permeable mobile bulk material filling the pockets of the mats. Each of the protrusions is flanked in a longitudinal direction of the respective mat and in a transverse direction thereof by recesses complementary to the protrusions and the protrusions and the recesses of each mat are arrayed thereon in criss-cross patterns. The mats are oriented with the protrusions of one of the mats fitting snugly into and filling the recesses of the other of the mats and the carrier webs are uniformly spaced apart over the assembly to define a body of uniform fluid permeability.

6 Claims, 2 Drawing Sheets

FILTER MEDIUM

CROSS REFERENCE TO RELATED APPLICATION

This application is a continuation-in-part of copending patent application 07/469,595 filed as PCT/EP89/00827, Jul. 15, 1989 (now abandoned).

FIELD OF THE INVENTION

The present invention relates to a system for containing and holding in position quantities of bulk material. More particularly this invention concerns such a system usable as a filter medium.

BACKGROUND OF THE INVENTION

It is known to imbed sorption or chemisorption masses between webs of fleece as formed shaped bodies in order to obtain filter mats usable as filter media. This is done by linking together two fleece webs containing the bulk material and imbedding the filtering masses between them. In order to maintain the filtering masses in position, the fleece webs are connected to each other so that small, cushion-shaped protrusions having a waffle-like or honeycomb structure result. This way, such a filter mat is of uneven thickness over the surface of the mat. This has the disadvantage that when a gas flows through such a filter mat for purposes of purification, different dwell times of the gas in the filter mat result, depending on the location where the gas passes through the filter mat. Furthermore, an increased gas passage takes place at the thinner locations with lower filling height, as well as at the connection points between the two fleece webs. Therefore, such filter mats are poorly suited to retain noxious substances with a good separation degree.

In order to avoid these disadvantages of the known filter mats, it has already been proposed to insert shaped bodies in the spaces between the cushion-shaped protrusions above the connection strips or to imbed in these areas premolded gratings of plastic material. However, these steps require considerable additional expense whose effects remain still unsatisfactory. Besides, the effective filtering surface is considerably reduced with respect to the available surface. Also the contact volume per space unit is reduced. A further drawback of these filter mats with waffle-like structure consists in the fact that the two fleece webs have to be particularly rigid in order to maintain their geometric shape, especially after they are built in, since a loss of shape can create hollow spaces through which the gas can escape.

OBJECTS OF THE INVENTION

It is therefore an object of the present invention to provide an improved filter medium.

Another object is the provision of such an improved filter medium which overcomes the above-given disadvantages, that is which uses a loose fluent filling but which nonetheless filters uniformly over its entire surface area.

SUMMARY OF THE INVENTION

A fluid-permeable assembly for uniformly contacting a fluid with a bulk material according to the invention has two mirror-symmetrically interfitting mats each having a generally planar fluid-permeable carrier web, another fluid-permeable web defining an array of protrusions uniformly distributed over the respective planar web and each forming a respective pocket and respective masses of a fluid-permeable mobile bulk material filling the pockets of the mats. Each of the protrusions is flanked in a longitudinal direction of the respective mat and in a transverse direction thereof by recesses complementary to the protrusions and the protrusions and the recesses of each mat are arrayed thereon in criss-cross patterns. The mats are oriented with the protrusions of one of the mats fitting snugly into and filling the recesses of the other of the mats and the carrier webs are uniformly spaced apart over the assembly to define a body of uniform fluid permeability.

This application produces an extraordinarily advantageous, highly efficient filtering device since the mirror-image arrangement of the mats and their snug fit into each other result in a layer of uniform thickness over their entire cross section. Thus permeable spots and differences in wall thickness are excluded.

According to a further feature of the invention the webs are webs of fleece and the bulk material is a filter material. The filter material is a sorption or chemisorption agent. In addition the permeability of one of the webs of each mat is greater than the permeability of the other web of the respective mat.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
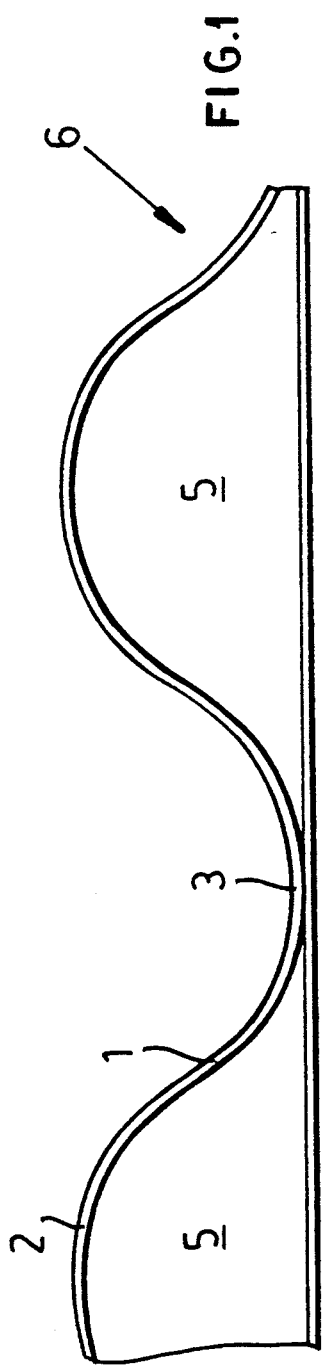
FIG. 1 is a section through a single mat according to the invention.
Figure 2:
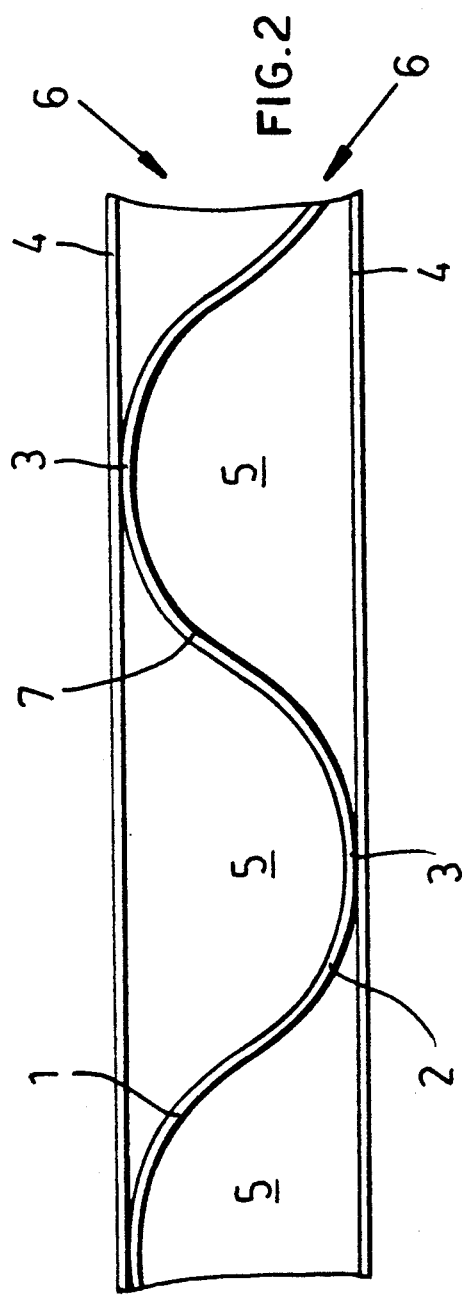
FIG. 2 is a section through two of the mats together forming a filter medium.
Figure 3:
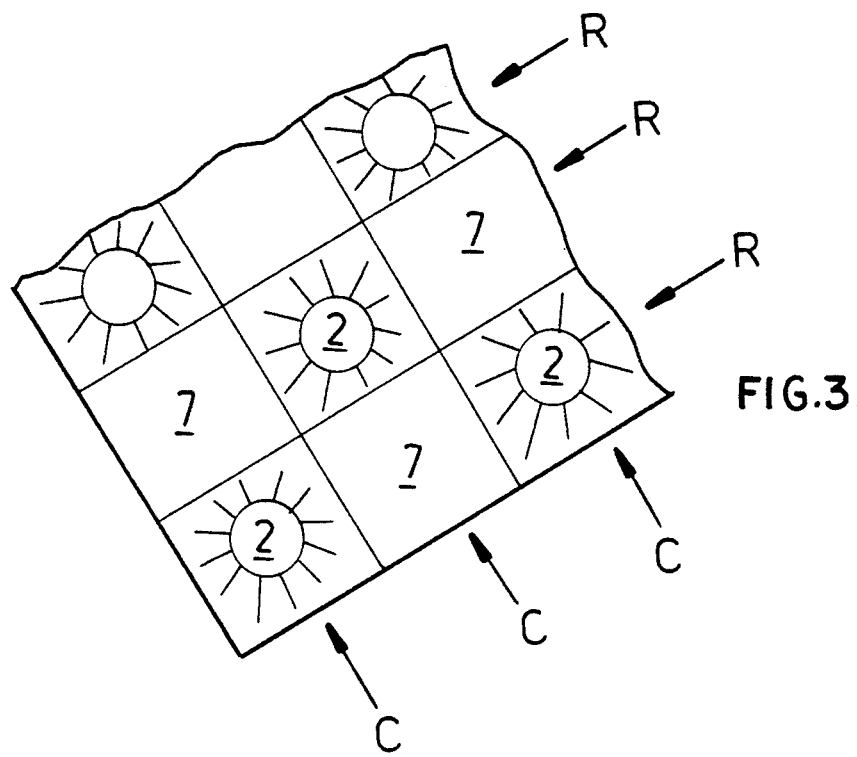
FIG. 3 is an isometric view of the mat of FIG. 1.

As seen in FIGS. 1 through 3 a fleece web 1 is provided with bumps or protrusions 2 symmetrically distributed over its surface. The protrusions 2 are bounded by seams 3 running in the longitudinal and transverse directions of this web 1 and forming an array of recesses 7 that are interleaved with the array of bumps 2 and that are of a shape identical to that of the protrusions 2. The seams 3 are fastened to another fleece web 4, representing the carrier web, for instance by welding, gluing, or stitching. The web or sheet 4 can be relatively stiff or rigid while the sheet 1 can be soft and flexible.

The cushion-like protrusions 2 are filled with loose particulate masses 5 of filter media. These are kept in place within the cushion-like protrusions 2 by the connection strips 3 that run criss-cross to form a mat 6.

As can be seen from FIG. 2, the system for containing and holding in position of specific quantities of bulk material is formed by two filter mats 6 according to FIG. 1. The arrangement is such that these mats 6 lie on top of each other, rotated by 180° with respect to each other with the protrusions 2 of the one web 1 of the first mat 6 fitting into the interstices or recesses 7 formed by the connection strips 3 in the second mat 6 and with the two webs 1 in all-over surface contact.

Figure 4:
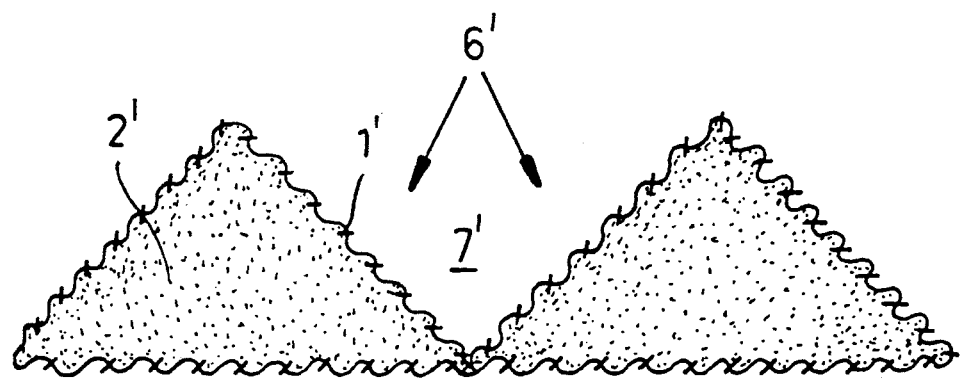
FIG. 4 is a view like FIG. 1 showing another arrangement according to the invention.

FIG. 4 shows an arrangement similar to that of FIGS. 1 through 3 except that the bumps 2' here are of pointed pyramidal shape and the interleaved recesses 7' are of identical shape. Two such mats 6' can fit together just like the mats 6, with the two webs 1' engaging each other in all-over surface contact.

We claim:

1. A fluid-permeable assembly for uniformly contacting a fluid with a bulk material, the assembly comprising two mirror-symmetrically interfitting mats each having a generally planar fluid-permeable carrier web, another fluid-permeable web defining an array of protrusions uniformly distributed over the respective planar web and each forming a respective pocket, each of the protrusions being flanked in a longitudinal direction of the respective mat and in a transverse direction thereof by recesses complementary to the protrusions, the protrusions and the recesses of each mat being arrayed thereon in crisscross patterns, and respective masses of a fluid-permeable mobile bulk material filling the pockets of each of the mats, the mats being oriented with the protrusions of one of the mats fitting snugly into and filling the recesses of the other of the mats, the carrier webs being uniformly spaced apart over the assembly to define a body of uniform fluid permeability.

2. The fluid permeable assembly defined in claim 1 wherein the webs are webs of fleece and the bulk material is a filter material.

3. The fluid permeable assembly defined in claim 2 wherein the filter material is a sorption or chemisorption agent.

4. The fluid permeable assembly defined in claim 1 wherein the permeability of one of the webs of each mat is greater than the permeability of the other web of the respective mat.

5. The fluid permeable assembly defined in claim 1 wherein the planar web is rigid and the other web is flexible.

6. A filter medium comprising two substantially identical mats each in turn comprising:

a generally planar fluid-permeable carrier web;

another fluid-permeable web defining an array of bumps uniformly distributed over the respective planar web each forming with the planar web a respective pocket, each of the bumps being flanked in a longitudinal direction of the respective mat and in a transverse direction thereof by recesses complementary to the bumps, the bumps and the recesses of each mat being arrayed thereon in an alternating criss-cross pattern; and respective masses of a fluid-permeable mobile bulk material filling the pockets, the mats being oriented with the bumps of one of the mats fitting snugly into and filling the recesses of the other of the mats with the carrier webs uniformly spaced apart over the assembly to define a body of uniform fluid permeability and the other webs engaging each other in full surface contact.

* * * * *